United States Patent [19]

Nomura

[11] Patent Number: 4,993,542
[45] Date of Patent: Feb. 19, 1991

[54] BELT CONVEYOR

[75] Inventor: Ryouichi Nomura, Toyama, Japan

[73] Assignee: NIC Autotec Company, Limited, Toyama, Japan

[21] Appl. No.: 501,855

[22] Filed: Mar. 30, 1990

[51] Int. Cl.$^5$ .............................................. B65G 23/44
[52] U.S. Cl. .................................. 198/816; 198/836.1; 198/860.2; 198/861.1; 198/841
[58] Field of Search ............... 198/816, 814, 813, 835, 198/836, 841, 861.1, 836.1, 860.2

[56] References Cited

U.S. PATENT DOCUMENTS

| | | | |
|---|---|---|---|
| 1,857,898 | 5/1932 | Wallace | 198/816 X |
| 3,292,772 | 12/1966 | Rice | 198/816 X |
| 3,332,538 | 7/1967 | Rice | 198/816 X |
| 3,605,994 | 9/1971 | Parlette | 198/841 X |
| 3,669,244 | 6/1972 | Pagdin et al. | 198/841 |
| 3,718,197 | 2/1973 | Barten et al. | 198/816 X |
| 3,800,938 | 4/1974 | Stone | 198/841 |
| 3,878,937 | 4/1975 | Glaser et al. | 198/816 |
| 3,944,054 | 3/1976 | Ensinger | 198/835 X |
| 4,511,031 | 4/1985 | Lachonius | 198/836 |
| 4,930,623 | 6/1990 | Johnson et al. | 198/841 X |

FOREIGN PATENT DOCUMENTS

0239575 10/1986 Fed. Rep. of Germany ...... 198/813

Primary Examiner—D. Glenn Dayoan
Attorney, Agent, or Firm—Wegner, Cantor, Mueller & Player

[57] ABSTRACT

A belt conveyor in which a housing is provided at each longitudinal end of the main frame for accommodating a pulley therein. An endless belt is passed around the pulleys and extend along the upper and lower surfaces of the main frame. Each of the housings consists of a pair of housing blocks attached to either side surface of each end portion of the main frame to rotatably received the pulley therebetween. Each of the housing blocks is provided with a pair of L-shaped pawls which are slidably received by slots provided in the upper and lower surfaces of the main frame, and guide projections slidably received by slots provided in lateral surfaces of the main frame. The slots in the lateral surfaces may have a T-shaped cross section so that the housing block may be secured to the side surface of the main frame by passing a threaded bolt through the housing block and threading it with a nut longitudinally slidably but otherwise unremovable received by the slots in the side wall surfaces of the main frame.

11 Claims, 8 Drawing Sheets

BELT CONVEYOR

TECHNICAL FIELD

The present invention relates to a belt conveyor utilizing housing blocks for forming housings at either longitudinal end of a belt conveyor to rotatably accommodate a belt pulley therein, and in particular to such a belt conveyor which can be easily assembled with a required dimensional accuracy and a structural rigidity.

BACKGROUND OF THE INVENTION

Figure 7A:
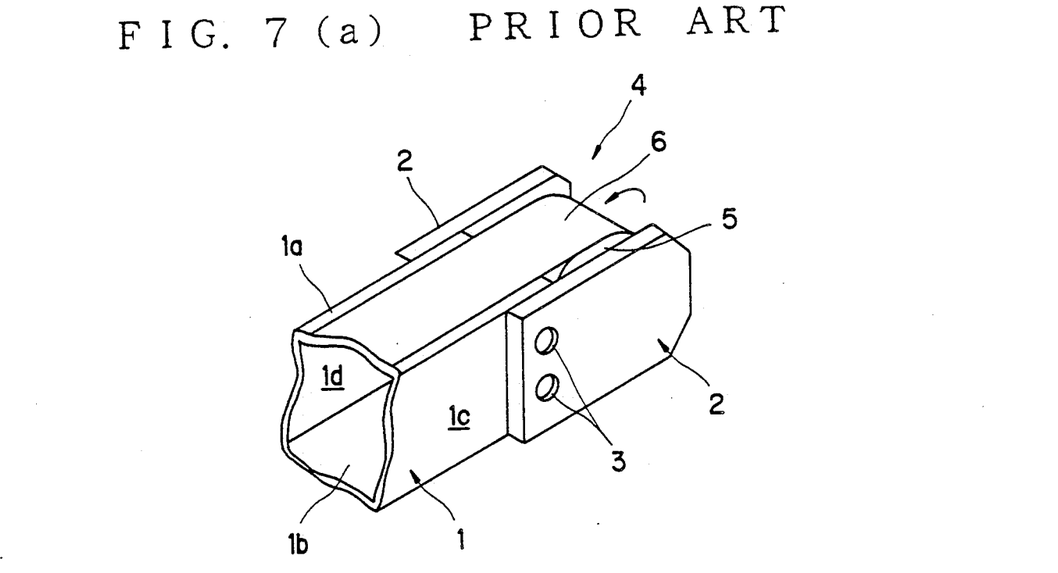
FIG. 7(a) is a fragmentary perspective view of a housing of a conventional belt conveyor.
Figure 7B:
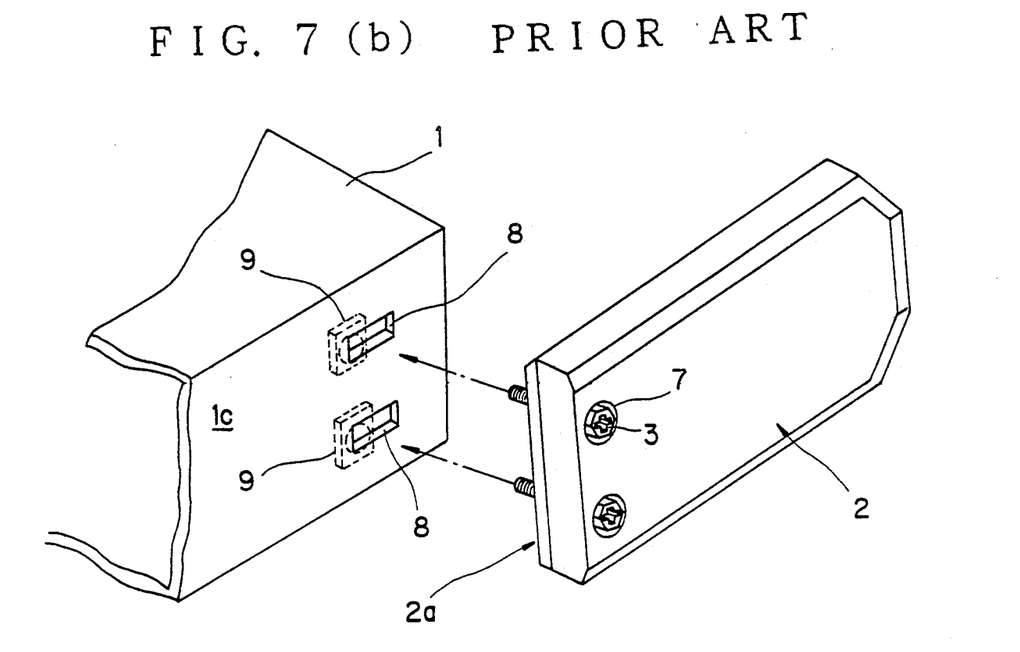
FIG. 7(b) is an exploded perspective view showing how each housing block of this conventional housing is mounted on the main frame.

Conventionally, housings at drive shaft and idler shaft ends of a conveyor main frame of a relatively small belt conveyor designed for conveying mechanical component parts are typically mounted on the main frame in the fashion as illustrated in FIGS. 7(a) and 7(b).

Specifically, the conveyor main frame 1 consists of an elongated hollow rectangular box made of an extruded aluminum member, and a pair of housing blocks 2 each made of a planar plastic plate member are attached on either outer side wall 1c and 1d at each end portion of the conveyor main frame 1 by way of bolts 3 so as to form a housing 4 defined by the housing blocks 2 on either side.

As well known in the art, a pulley 5 is rotatably received between the inner surfaces 2a of the housing blocks 2 for each of the housings 4, one of which is a drive shaft end housing equipped with a motor not shown in the drawings while the other housing 4 is an idler shaft end housing.

An endless belt 6 is passed around the pulleys 5 of the drive shaft end and idler shaft end housings and along the upper and lower outer walls 1a and 1b of the conveyor main frame 1 so that the endless belt 6 may be moved under the driving force of the motor.

The assembling of the housings for such a conventional belt conveyor has substantially been carried out as described in the following with reference to FIG. 7(b).

First of all, one end of each of the housing blocks 2 consisting of a rectangular planar body is placed on a specified part of an outer wall 1c or 1d of an end portion of the conveyor main frame 1. Then, bolts 3 are passed through mounting holes 7 provided in the housing block 2, and then into slots 8 provided in the conveyor main frame 1 so as to thread the bolts 3 with nuts 9 provided inside the slots 8 and secure the housing block 2 to the conveyor main frame 1.

According to such a belt conveyor, it is necessary that the housing blocks 2 on either side of each end of the conveyor main frame 1 oppose each other with a high dimensional precision. Should there be any dimensional errors in the mounting positions of the housing blocks 2 on either side, the pulley 5 around which the endless belt 6 is passed may not be placed exactly perpendicularly to the feeding direction of the endless belt 6, and the endless belt 6 may sway laterally back and forth in its driven condition thereby rendering satisfactory and smooth operation of the belt conveyor impossible.

However, according to such conventional housing blocks 2, as they consisted simply of planar members which are simply attached to the planar outer side walls 1c and 1d of the conveyor main frame 1, it has been extremely difficult to accurately locate and secure housing blocks 2 so as to mount a pulley 5 perpendicularly to the feeding direction of the endless belt 6, and a considerable loss of efficiency has been unavoidable.

Further, since each end portion of the conveyor main frame 1 was provided with right angle corner edges, a considerable contact pressure was applied from the corner edges of the conveyor main frame 1 to the endless belt 6 as it moves from the upper or lower surface of the conveyor main frame 1 to one of the pulleys 5, or from one of the pulleys to the upper or lower surface of the main frame 1, and it presented a certain problem in regards to the long term durability of the endless belt 6.

Additionally, in many cases, guide bars and guide plates were attached to the outer side walls 1c and 1d of the conveyor main frame 1 to prevent mechanical component parts or the likes which are being conveyed from falling off from the belt conveyor, and the users had to prepare such attachments themselves. Since such attachments were normally fixedly secured to the conveyor main frame 1, and cannot be adjusted at will, there were cases in which it was not possible to entirely prevent mechanical component parts of different heights from falling off from the endless belt.

BRIEF SUMMARY OF THE INVENTION

In view of such problems of the prior art, a primary object of the present invention is to provide a belt conveyor which can be assembled with a high dimensional accuracy and a high structural rigidity.

A second object of the present invention is to provide a belt conveyor which can operate smoothly without its endless belt swaying back and forth laterally.

A third object of the present invention is to provide a belt conveyor which is capable of finely adjusting the orientation and position of its pulleys.

A fourth object of the present invention is to provide a belt conveyor which is provided with means for attaching side holders so as to prevent articles from falling off from the endless belt as they are being conveyed.

These and other objects of the present invention can be accomplished by providing a belt conveyor an elongated main frame having a pair of longitudinal end surfaces, and upper and lower surfaces, each of the upper and lower surfaces being provided with a pair of slots extending longitudinally at least near each of the longitudinal ends; a housing provided at each longitudinal end of the main frame; a pulley received in each of the housings so as to be rotatable around an axial line substantially perpendicular to a longitudinal line of the main frame; an endless belt passed around the pulleys and extending along the upper and lower surfaces of the main frame; and a motor coupled with one of the pulleys to move the endless belt along the upper and lower surfaces of the main frame and around the pulleys; each of the housings consisting of a pair of housing blocks each having means for rotatably supporting one of the pulleys and a pair of L-shaped pawls which are adapted to be received by the slots.

Thus, the L-shaped engagement pawls can be used as a guide for locating and securing each of the housing blocks at a desired location in an end portion of the main frame with a desired dimensional precision. Preferably, each of the pawls is provided with a stopper surface which abuts one of the end surfaces of the main frame in order to ensure a dimensional accuracy without requiring any effort during the assembling process. To further improve this effect, the main frame may be provided with a pair of side surfaces and a guide slot extending longitudinally along each of the side surfaces at least near each of the end surfaces, the housing block being provided with a projection which is adapted to be guided along the guide slot.

If each of the guide slots is provided with a T-shaped cross section longitudinally slidably but otherwise unremovably receiving a nut therein, and each of the housing blocks is provided with an opening, a threaded bolt may be passed through the opening and be threaded with the nut to simply and securely attach the housing block to the main frame. A particularly secure and precise attachment is possible if the opening for passing the threaded bolt is passed through the guide projection thereby longitudinally separating it into two parts, and the height of the guide projection is determined so as to abut a bottom surface of the guide slot at either side of the threaded bolt when the threaded bolt is fully threaded with the nut.

Preferably, each of the pawls has an upper surface which is flush with the upper or lower surface of the main frame, and a sloping upper surface so as to define a favorable guide surface for the endless belt and improve its long term durability.

So that the housing blocks may be finely adjusted of their positions relative to the main frame, each of the housing blocks may be provided with an opening for receiving an eccentric pin so that the longitudinal position of the housing may be adjusted by turning the eccentric pin and engaging a part of the eccentric pin with a part of the main frame.

The slots on the side surfaces of the main frame may be conveniently utilized to mount a holder block for guiding articles which are being conveyed by the endless belt on the main frame by way of a bolt passed through the guide block and threaded with a nut slidably but otherwise unremovably received in the guide slot in such a manner that the longitudinal position of the holder block may be adjusted. If the opening of the guide block consists of a vertically elongated slot and an upper end of the holder block is provided with a lateral T-slot, the vertical and lateral position of the holder block may be also adjusted.

BRIEF DESCRIPTION OF THE DRAWINGS

Now the present invention is described in the following with reference to the appended drawings, in which.

DETAILED DESCRIPTION OF A PREFERRED EMBODIMENT

Figure 1:
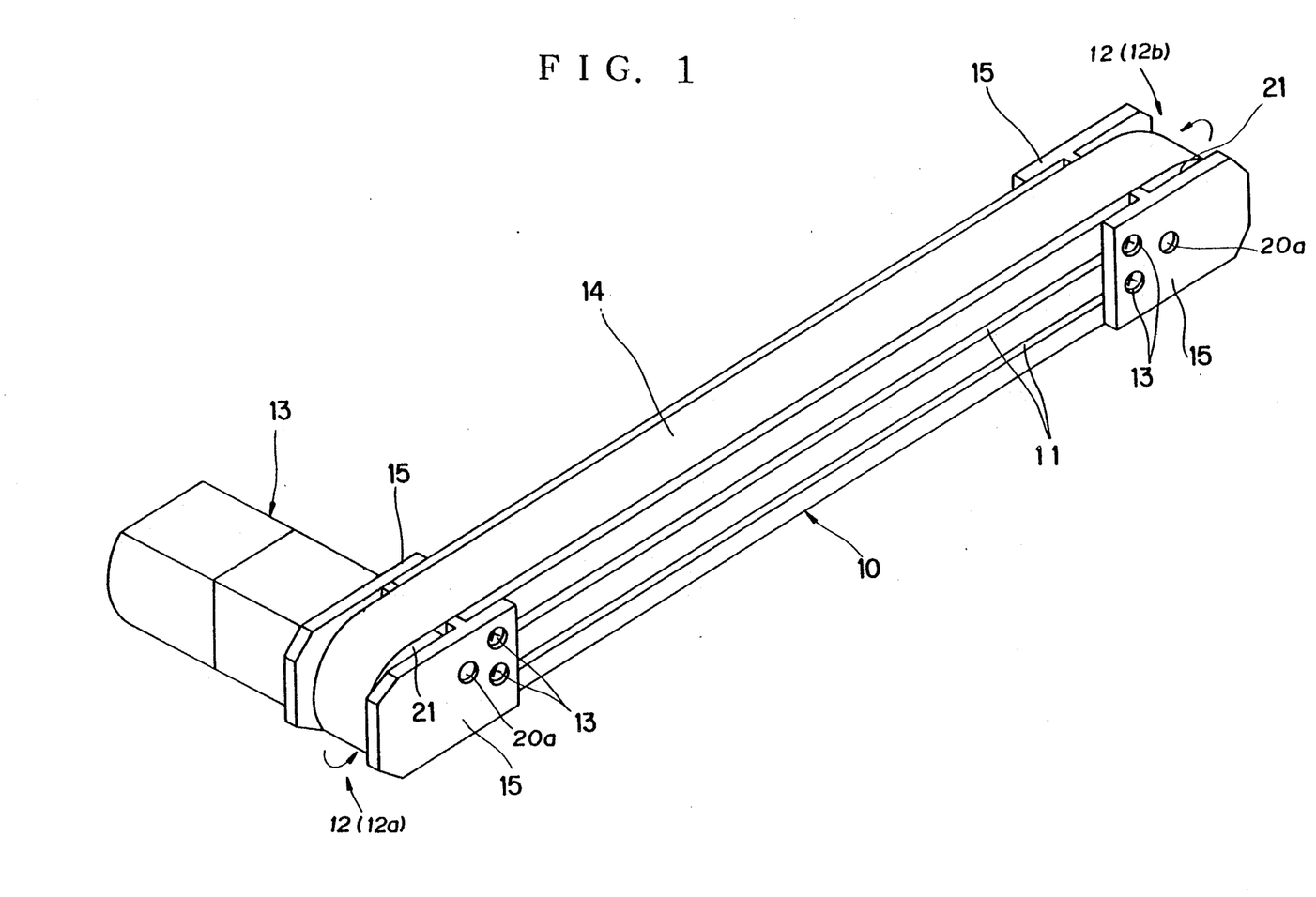
FIG. 1 is a general perspective view of a preferred embodiment of the belt conveyor according to the present invention.
Figure 3:
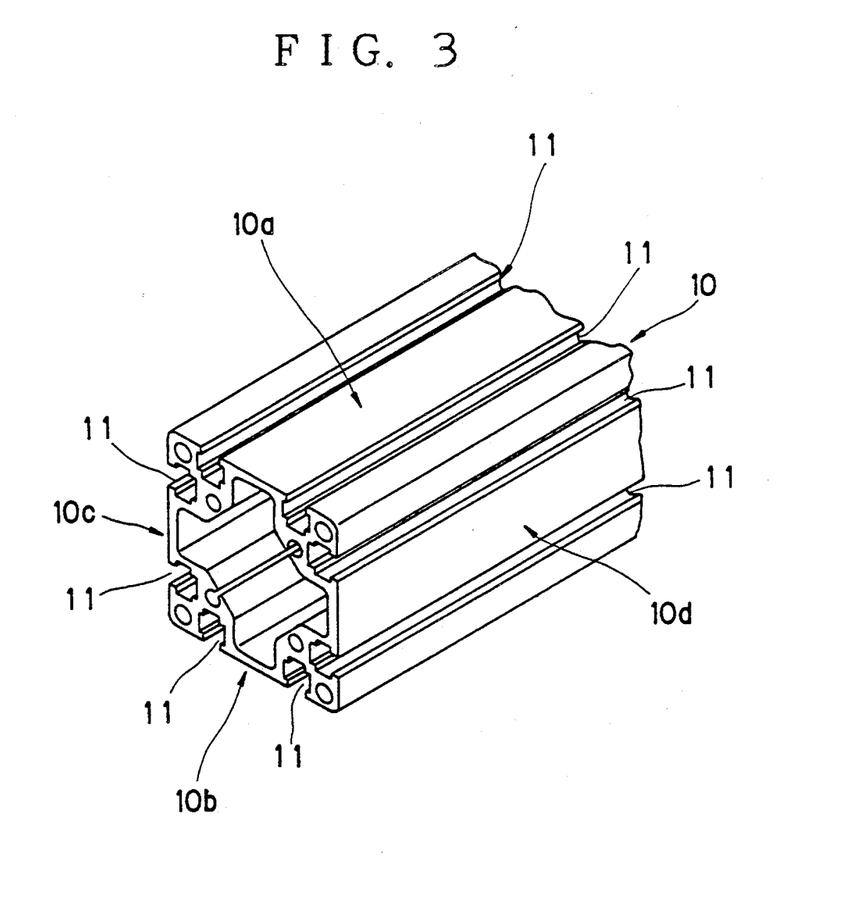
FIG. 3 is a fragmentary perspective end view of the conveyor main frame given in FIG. 1.

Referring to FIG. 1, the main frame 10 of this belt conveyor consists of a hollow, rectangular box made of an extruded aluminum member, and its upper, lower, right and left walls 10a, 10b, 10c and 10d are each provided with a pair of T-slots 11 extending longitudinally as shown in FIG. 3 for slidably receiving rectangular nuts as described hereinafter. Each slot is narrower at its outer opening than at its inner part so that nuts may be received in the slot so as to be longitudinally slidable but otherwise unremovable.

Numeral 12 denotes a housing provided at each end portion of the conveyor main frame 10. The housings 12 consist of a drive shaft end housing 12a including a motor, and an idler shaft end housing 12b. Each of the housings 12 consists of a pair of housing blocks 15 mounted on either outer side wall 10c and 10d of the conveyor main frame 10 by bolts 13.

Numeral 14 denotes a known endless belt, and is passed along the upper and lower outer walls 10a and 10b of the conveyor main frame 10 and around the pulleys 21 accommodated in the drive shaft end and idler shaft end housings 15a and 15b.

Figure 2:
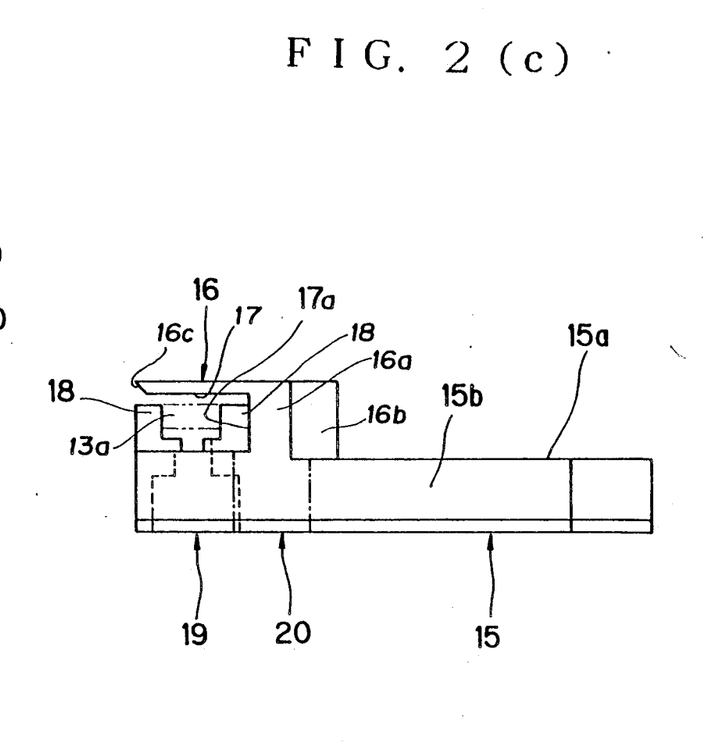
FIGS. 2(a) through 2(c) are perspective, side and plan views, respectively, showing one of the housing blocks given in FIG. 1 in enlarged scale.
Figure 2A:
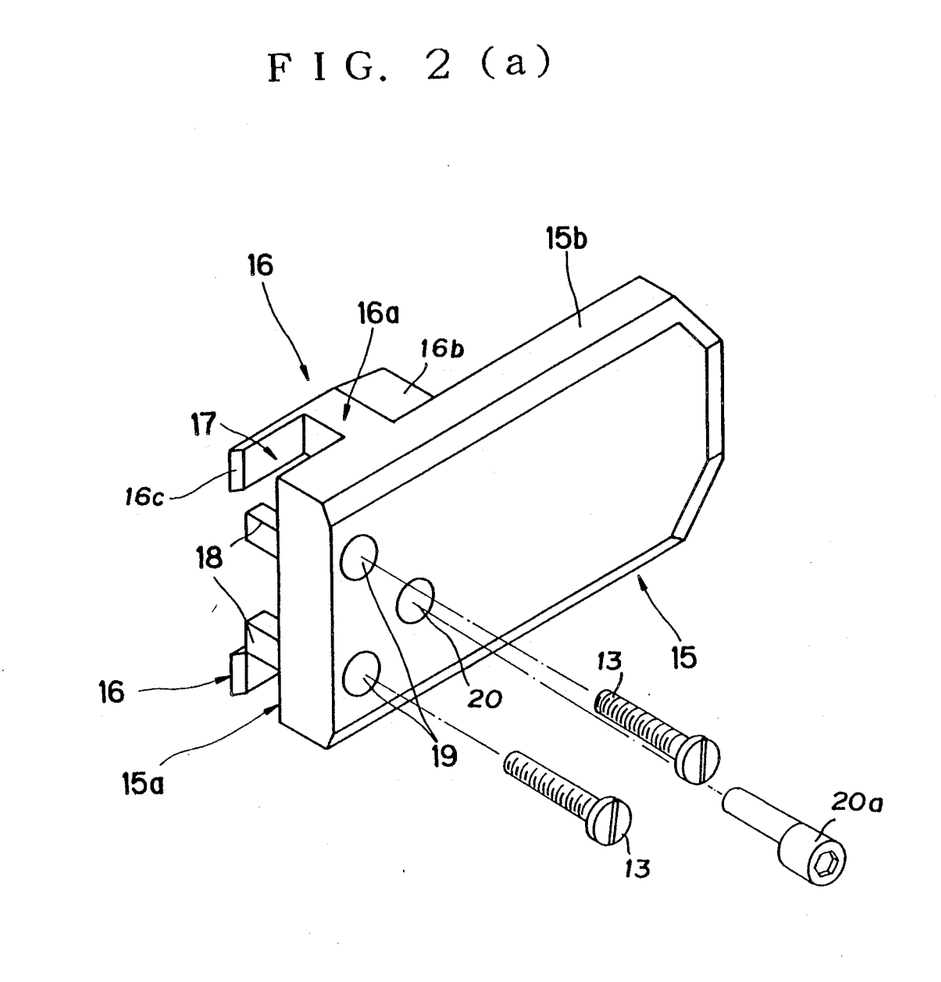

Referring to FIG. 2, each of the housing blocks 15 consists of a rectangular planar member which is adapted to be attached to either outer side wall 10c or 10d of the conveyor main frame 10, and is provided with a pair of L-shaped engagement pawls 16 and a pair of guide projections 18 projecting from an inner surface 15a thereof, and mounting holes 19 and an eccentric pin receiving hole 20 passed through the housing block 15.

The L-shaped engagement pawls 16 each project towards the center of the conveyor main frame 1 by way of a locating stopper 17 and have an upper surface 16a which is flush with the upper surface of the upper wall 10a of the main frame 10 when the L-shaped engagement pawls 16 are fitted into the guide slots 11 provided in the upper and lower outer walls 10b and 10d of the main frame 10. The upper surface 16a of each of the engagement pawls 16 further defines a downwardly inclining surface at its portion facing away from the locating stopper 17 so that a smooth guide surface 16b for the endless belt 14 may be defined between an end of the upper surface of the main frame 10 and the pulley so that the rubbing of the endless belt 14 with a corner edge of the main frame 10 may be avoided. This guide surface 16b may also consist of a curved surface instead of a linear inclined surface. In the present embodiment, the engagement pawls 16 are provided as a pair facing vertically each other on the inner surface 15a of the housing block 15.

The guide projections 18 extend longitudinally along the inner surface 15a of the housing block 15 between the engagement pawls 16 so as to be slidably fitted into the associated T-slots 11 provided in one of the outer side walls 10c and 10d of the conveyor main frame 10. The number of the guide projections 18 may be selected according to the number of the T-slots 11.

The mounting holes 19 are provided in the conveyor main frame end of the housing block 15 so that the housing block 15 may be securely attached to the conveyor main frame 10 by passing the bolts 13 through these mounting holes 19 and threading the bolts 13 with rectangular nuts 13a which are slidably received in the slots 11 so as to occupy the position relative to the housing block 15 as indicated by the imaginary line in FIG. 2(c). More specifically, each of the mounting holes 19 is passed through an associated one of the guide blocks 18, and longitudinally separates it into two parts. Therefore, when the bolt 13 is threaded with the associated nut 13a, each of the guide blocks 18 abuts the bottom surface of the T-slot 11 at either side of the bolt 13. Therefore, a highly secure and precise attachment of the housing block 15 to the main frame 10 is made possible.

The eccentric pin receiving hole 20 is provided in a middle part of the housing block 15 so as to slightly overlap with the bottom surface 17a of the locating stopper 17 which may be considered as consisting of a slot defined by each of the L-shaped engagement pawls 16. The inner side surface 15a of the housing block 15 is provided with a recess 22 for receiving one of the pulleys 21 therein as illustrated by dotted lines in FIG. 4(a), as well as the engagement pawls 16 and the guide projections 18.

Now the process of assembling this belt conveyor is described in the following.

First of all, one of the housing blocks 15 is placed on an end portion of the conveyor main frame 10 with the upper surface of the upper wall 10a of the housing block 15 placed flush with the upper surface 15b of the conveyor main frame 10. Here, the T-slots 11 in the upper wall 10b of the housing block 10 and the L-shaped engagement pawls 16 of the housing block 15 are placed opposite to each other, and the T-slots 11 of one of the side walls 10c or 10d of the conveyor main frame 10 and the guide projections 18 are also placed opposite to each other. Then, by pushing the housing block 15 towards the end surface of the conveyor main frame 10, the engagement pawls 16 of the housing block 15 are forced into the T-slots 11 in the upper wall 10a of the conveyor main frame 10. Since the forward ends of the L-shaped engagement pawls 16 are tapered as indicated by numeral 16c, they can be smoothly fitted into the T-slots 11. Meanwhile, the guide projections 18 of the housing block 15 are also forced into the T-slots 11 in one of the side walls 10c or 10d of the conveyor main frame 10 at the same time as the engagement pawls 16 of the housing block 15 are forced into the T-slots 11 in the upper wall 10a of the conveyor main frame 10.

The relative position between the housing block 15 and the conveyor main frame 10 is primarily determined by the L-shaped engagement pawls 16 being forced into the associated slots 11 until the bottom surface 17a of the locating stopper 17 abuts an end surface of the conveyor main frame 10. However, it is extremely difficult to form the end surfaces of the conveyor main frame 10 and the slots of the locating stoppers 17 with a sufficient dimensional accuracy, and some dimensional fluctuations and variations in these parts are unavoidable to a certain extent.

Figure 4:
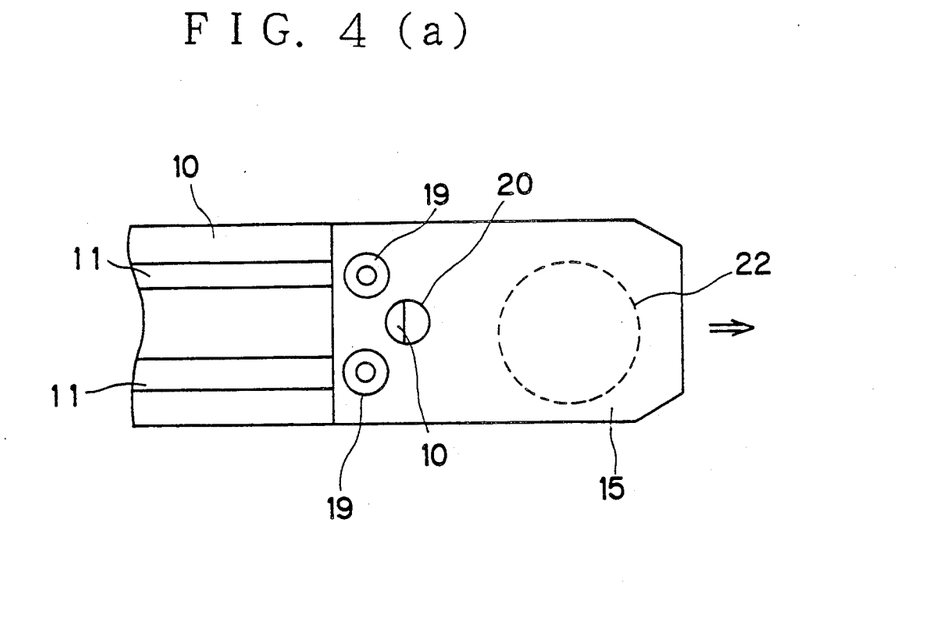
FIG. 4(a) is a side view showing a housing part of FIG. 1.
FIG. 4(b) is a plan view of the same.

Therefore, as a secondary measure for ensuring a high dimensional accuracy, by fitting an eccentric pin 20a (see FIGS. 2(a) and 4) into the eccentric pin receiving hole 20 of each of the housing blocks 15 and turning them as required, it is possible to move the housing blocks 15 along the direction of the arrow (see FIGS. 4) by the amount of the eccentricity of the eccentric pin 20a with the outer circumferential surface of the pin 20a abutting the end surface of the conveyor main frame 10 for the purpose of fine adjustment of the position of each of the housing blocks 15.

Thus, it is made possible to mount the pulley 21 which is rotatably mounted between the housing blocks 15 on either side on the housing 12 both easily and accurately so as to be perpendicular to the feeding direction of the endless belt 14.

Thereafter, by passing the bolts 13 through the mounting holes 19 of the housing block 15 and threading them with rectangular nuts 13a received in the T-slots 11 of the side walls 10c and 10d of the conveyor main frame 10, it is possible to secure the housing blocks 15 at desired locations and locate them with a high accuracy. In particular, since each of the guide blocks 18 is separated into two parts by the mounting hole 19, when the bolt 13 is threaded with the associated nut 13a, the two parts of the guide block 18 abut the bottom surface of the T-slot 11 at either side of the bolt 13. Therefore, a highly secure and precise attachment of the housing block 15 to the main frame 10 is made possible.

The following steps of mounting the endless belt 14 and the motor 13 are not different from those of the prior art, and are not described here.

Now the attachments used on this belt conveyor are described in the following with reference to FIGS. 5 and 6. These drawings show a guide mechanism standing upright on either side wall 10c and 10d of the conveyor main frame 10 for guiding the mechanical component parts conveyed thereby, and numeral 23 denotes a holder block which is detachable mounted on a side wall 10c or 10d of the conveyor main frame 10.

Figure 5A:
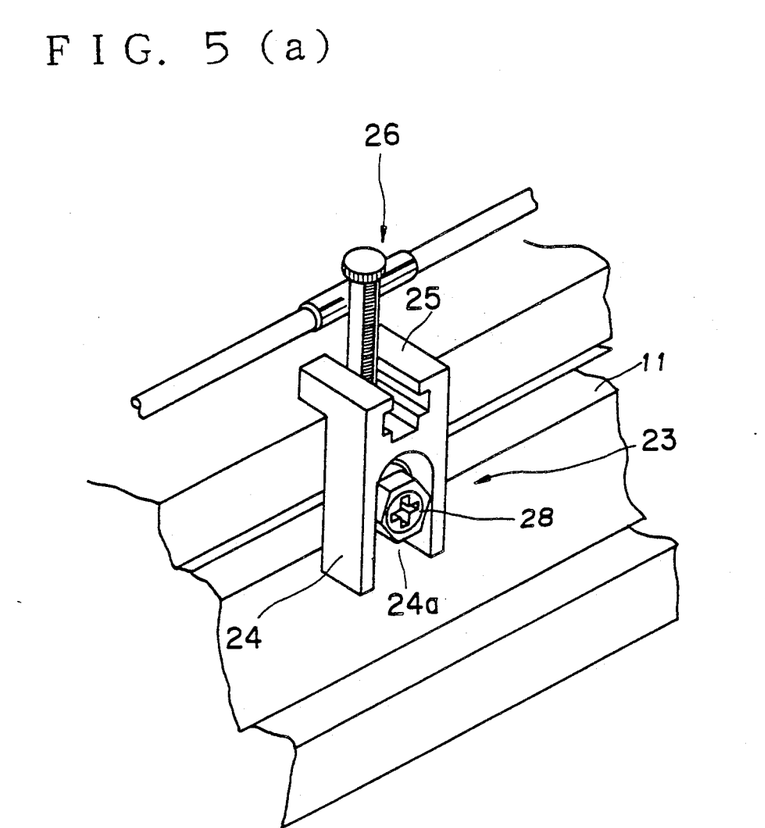
FIG. 5(a) is a perspective view of a first example of the holder block which may be mounted on the conveyor main frame of FIG. 1.
Figure 5B:
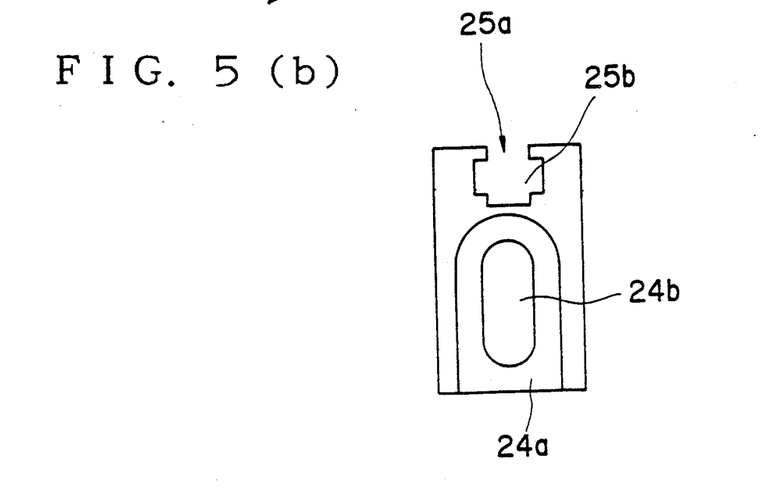
FIG. 5(b) is a front view of the holder block.
Figure 6:
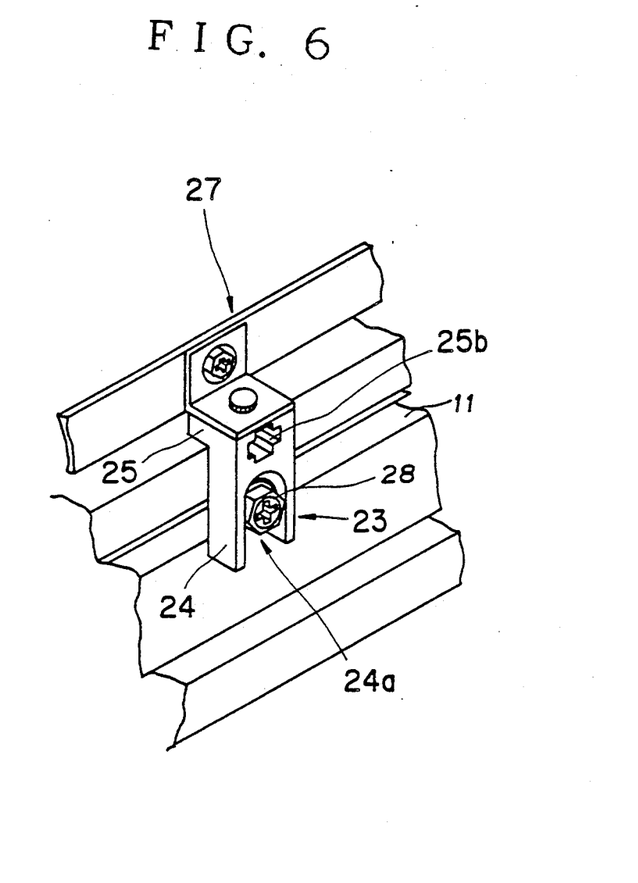
FIG. 6 is a perspective view showing another example of the holder block.

Referring to FIGS. 5(a) and 5(b), the holder block 23 consists of a coupling portion 24 which is secured to the side wall 10c or 10d of the conveyor main frame 10, and an engagement portion 25 which stands upwards from the coupling portion 24 and is mainly engaged by the upper wall 10a of the conveyor main frame 10, so that the holder block 23 is generally provided with an L-shaped cross section.

The coupling portion 24 is provided with a semicircular recess 24a which opens out downwards at its outer end and is formed as a vertically elongated slot 24b receiving a bolt 28 at its inner end as illustrated in FIG. 5(b). The engagement portion 25 opens out at its upper end as an opening 25a, and is provided with a T-slot 25b extending laterally of the main frame 10 for receiving a rectangular nut (not shown in the drawings) or the like so as to be slidable along the slot 25b but otherwise unremovable from the slot 25b. The engagement portion 25 can be utilized to detachably mount a bar holder 26 as illustrated in FIG. 5(a) or a guide plate 27 as illustrated in FIG. 6.

Thus, according to this holder block 23, the bolt 28 is passed through the slot 24b, and is threaded with a rectangular nut (not shown in the drawings) received in the T-slot 11 provided in the side wall 10c or 10d of the conveyor main frame 10 so that the holder block 23 may be adjusted to a desired height by way of the slot 24b and to a desired longitudinal location by way of the T-slot 11, and securely fixed thereat by fastening the bolt 28.

Further, it is made possible to easily adjust the lateral position of the bar holder 26 (FIG. 5(a)) or the guide plate 27 (FIG. 6) by making use of the T-slot 25b provided in the engagement portion 25 and a threaded bolt threaded with a nut slidably but otherwise unremovably received by this lot 25b.

Thus, by using any of these holder blocks 23, it is possible to prevent the articles to be conveyed from falling off, and can accurately convey them.

Although the present invention has been described by way of example with reference to the accompanying drawings, it is apparent to those skilled in the art that various changes and modifications can be made thereto without departing from the spirit of the present invention.

What we claim is:

1. A belt conveyor, comprising:
   an elongated main frame having a pair of longitudinal end surfaces, and upper and lower surfaces, each of said upper and lower surfaces being provided with a pair of slots extending longitudinally at least near each of said longitudinal ends;
   a housing provided at each longitudinal end of said main frame;
   a pulley received in each of said housings so as to be rotatable about an axial line substantially perpendicular to a longitudinal line of said main frame;
   an endless belt passed around said pulleys and extending along said upper and lower surfaces of said main frame; and
   a motor coupled with one of said pulleys to move said endless belt along said upper and lower surfaces of said main frame and around said pulleys;
   each of said housings consisting of a pair of housing blocks each having means for rotatably supporting said pulleys and a pair of L-shaped pawls which are adapted to be received by said slots.

2. A belt conveyor according to claim 1, wherein each of said pawls is provided with a stopper surface which abuts one of said end surfaces of said main frame.

3. A belt conveyor according to claim 1, wherein each of said pawls has an upper surface which is flush with said upper or lower surface of said main frame.

4. A belt conveyor according to claim 3, wherein each of said L-shaped pawls is provided with a sloping upper surface serving as a guide surface for said endless belt.

5. A belt conveyor according to claim 1, wherein said main frame is provided with a pair of side surfaces and a guide slot extending longitudinally along each of said side surfaces at least near each of said end surfaces, said housing block being provided with a projection which is adapted to be guided along said guide slot.

6. A belt conveyor according to claim 5, wherein each of said guide slots in said side surfaces is provided with a T-shaped cross section longitudinally slidably but otherwise unremovably receiving a nut therein, and each said housing block is provided with an opening through which a threaded bolt may be passed so as to be threaded with said nut.

7. A belt conveyor according to claim 6, wherein said opening for passing said threaded bolt extends through said guide projection thereby longitudinally separating it into two parts, a height of said guide projection being determined so as to abut a bottom surface of said guide slot at either side of said threaded bolt when said threaded bolt is fully threaded with said nut.

8. A belt conveyor according to claim 1, wherein each of said housing blocks is provided with an opening for receiving an eccentric pin so that the longitudinal position of said housing may be adjusted by turning said eccentric pin and engaging a part of said eccentric pin with a part of said main frame.

9. A belt conveyor according to claim 6, wherein said slots having said T-shaped cross section extend substantially over an entire length of said main frame so that a holder block for guiding articles being conveyed by said endless belt may be attached to said main frame by way of a bolt passed through an opening of said holder block and threaded with a nut longitudinally slidably but otherwise unremovably received in said guide slot.

10. A belt conveyor according to claim 9, wherein said opening of said holder block consists of a vertically elongated slot.

11. A belt conveyor according to claim 10, wherein an upper end of said holder block is provided with a lateral T-slot.

* * * * *